(12) United States Patent
Kikuchi et al.

(10) Patent No.: US 10,919,436 B2
(45) Date of Patent: Feb. 16, 2021

(54) VEHICLE CONTROL SYSTEM AND COLUMN TRAVELING SYSTEM

(71) Applicant: Yazaki Corporation, Tokyo (JP)

(72) Inventors: Hideaki Kikuchi, Shizuoka (JP); Hiroyuki Ogura, Shizuoka (JP); Tatsuya Shiratori, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/809,024

(22) Filed: Mar. 4, 2020

(65) Prior Publication Data

US 2020/0198522 A1 Jun. 25, 2020

Related U.S. Application Data

(63) Continuation of application No. PCT/JP2017/036840, filed on Oct. 11, 2017.

(51) Int. Cl.
*B60Q 1/04* (2006.01)
*H04W 4/46* (2018.01)
*B60Q 1/34* (2006.01)
*G08G 1/00* (2006.01)

(52) U.S. Cl.
CPC ............ *B60Q 1/04* (2013.01); *B60Q 1/34* (2013.01); *H04W 4/46* (2018.02); *G08G 1/22* (2013.01)

(58) Field of Classification Search
CPC . B60Q 1/04; B60Q 1/34; B60Q 1/525; B60Q 2400/50; B60Q 9/008; B60Q 1/50; B60Q 1/085; B60Q 1/503; B60Q 1/2607; B60Q 2300/112; B60Q 2300/314; B60Q 2300/322; H04W 4/46

USPC .............................. 701/117, 41, 428, 465, 49
See application file for complete search history.

(56) References Cited

U.S. PATENT DOCUMENTS

2017/0011633 A1  1/2017 Boegel
2020/0130567 A1* 4/2020 Taniguchi ............. B60W 30/12

FOREIGN PATENT DOCUMENTS

| JP | 2000293791 A | 10/2000 |
|---|---|---|
| JP | 2003-276502 A | 10/2003 |
| JP | 2010009235 A | 1/2010 |
| JP | 2010237792 A | 10/2010 |
| JP | 2014-130409 A | 7/2014 |
| JP | 2016-146131 A | 8/2016 |

* cited by examiner

*Primary Examiner* — Wei (Victor) Y Chan
(74) *Attorney, Agent, or Firm* — Sughrue Mion, PLLC

(57) ABSTRACT

A vehicle control system applied to a column traveling system includes: a communication unit that is disposed in a host vehicle, and configured to be able to transmit/receive communication information to/from another vehicle in a column that travels while being included in the column as a group together with the host vehicle; an output unit that is disposed in the host vehicle, and configured to be able to output a visual system output related to the sense of sight to the outside of the host vehicle; and a controller configured to be able to perform intra-column cooperation processing of controlling the output unit to cause a plurality of the visual system outputs to cooperate with each other in the entire column based on the communication information. As a result, the vehicle control system applied to the column traveling system enables appropriate column traveling to be performed.

16 Claims, 6 Drawing Sheets

VEHICLE CONTROL SYSTEM AND COLUMN TRAVELING SYSTEM

CROSS-REFERENCE TO RELATED APPLICATION

This application is a continuation application of International Application No. PCT/JP2017/036840 filed on Oct. 11, 2017.

BACKGROUND OF THE INVENTION

1. Field of the Invention

The present invention relates to a vehicle control system and a column traveling system.

2. Description of the Related Art

As a conventional vehicle control system and a column traveling system mounted on a vehicle for performing column traveling, for example, Japanese Patent Application Laid-open No. 2016-146131 discloses a column traveling management device mounted on a vehicle that performs column traveling using inter-vehicle communication, which transmits traveling information to a succeeding vehicle included in the column when being mounted on a head vehicle, and controls traveling based on the traveling information from the head vehicle when being mounted on the succeeding vehicle.

The column traveling management device disclosed in Patent Literature 1 described above has room for improvement to implement more appropriate column traveling based on a visual system output and the like output from a vehicle included in the column described above to the outside, for example.

SUMMARY OF THE INVENTION

The present invention has been made in view of such a situation, and provides a vehicle control system and a column traveling system that can enable appropriate column traveling to be performed.

In order to achieve the above mentioned object, a vehicle control system according to one aspect of the present invention includes a communication unit that is disposed in a host vehicle, and configured to be able to transmit/receive a communication information to/from another vehicle in a column that travels while being included in the column as a group together with the host vehicle; an output unit that is disposed in the host vehicle, and configured to be able to output a visual system output related to the sense of sight to the outside of the host vehicle; and a controller configured to be able to perform an intra-column cooperation processing of controlling the output unit to cause a plurality of the visual system outputs to cooperate with each other in the entire column based on the communication information, wherein the output unit includes a direction indicator configured to cause a signal lamp to be blinking-displayed to output a direction indicating information related to a moving direction of the host vehicle as the visual system output, and the controller is configured to be able to perform, as the intra-column cooperation processing, a direction indicating information synchronization processing of controlling the direction indicator to synchronize an output timing of the direction indicating information with an output timing of other vehicle direction indicating information output from the other vehicle in the column, and to output the direction indicating information indicating the same direction as a moving direction of the other vehicle indicated by the other vehicle direction indicating information.

In order to achieve the above mentioned object, a vehicle control system according to another aspect of the present invention includes a communication unit that is disposed in a host vehicle, and configured to be able to transmit/receive a communication information to/from another vehicle in a column that travels while being included in the column as a group together with the host vehicle; an output unit that is disposed in the host vehicle, and configured to be able to output a visual system output related to the sense of sight to the outside of the host vehicle; and a controller configured to be able to perform an intra-column cooperation processing of controlling the output unit to cause a plurality of the visual system outputs to cooperate with each other in the entire column based on the communication information, wherein the output unit includes a rear output unit that is disposed in the rear in the vehicle longitudinal direction of the host vehicle, and configured to output a visual information as the visual system output, and the controller is configured to be able to perform, as the intra-column cooperation processing, a first rear visual information cooperation processing of controlling the rear output unit to output the visual information indicating information of traffic lights and a sign on a front side in the vehicle longitudinal direction imaged by the head vehicle in the vehicle longitudinal direction in the column, or configured to be able to perform a second rear visual information cooperation processing of controlling the rear output unit to output the visual information indicating a column configuration information related to the column including the host vehicle in a case in which the host vehicle is the rearmost vehicle in the vehicle longitudinal direction in the column.

According to still another aspect of the present invention, in the vehicle control system, it is possible to configured that the output unit includes a lighting output unit configured to output illumination light as the visual system output, and the controller is able to perform, as the intra-column cooperation processing, a lighting cooperation processing of controlling the lighting output unit to cause pieces of the illumination light to cooperate with each other in the entire column.

According to still another aspect of the present invention, in the vehicle control system, it is possible to configured that the output unit includes an information output unit configured to an output visual information as the visual system output, and the controller is configured to be able to perform, as the intra-column cooperation processing, output an information cooperation processing of controlling the information output unit to cause pieces of the visual information to cooperate with each other in the entire column.

According to still another aspect of the present invention, in the vehicle control system, it is possible to configured that the output unit includes a headlight configured to output, as the visual system output, front illumination light for lighting up the front in a vehicle longitudinal direction of the host vehicle, and the controller is configured to be able to perform, as the intra-column cooperation processing, a front lighting cooperation processing of controlling the headlight to output the front illumination light in a case in which the host vehicle is a head vehicle in the vehicle longitudinal direction in the column, and controlling the headlight to be in a lighting-OFF state in a case in which the host vehicle is a succeeding vehicle following the head vehicle.

According to still another aspect of the present invention, in the vehicle control system, it is possible to configured that the output unit includes a tail lamp configured to output, as the visual system output, rear illumination light for lighting up the rear in the vehicle longitudinal direction of the host vehicle, and the controller is configured to be able to perform, as the intra-column cooperation processing, a rear lighting cooperation processing of controlling the tail lamp to output the rear illumination light in a case in which the host vehicle is a rearmost vehicle in the vehicle longitudinal direction in the column, and controlling the tail lamp to be in a lighting-OFF state in a case in which the host vehicle is a preceding vehicle preceding the rearmost vehicle.

According to still another aspect of the present invention, in the vehicle control system, it is possible to configured that the output unit includes a side output unit that is disposed on at least one side in a vehicle width direction of the host vehicle, and configured to output a visual information as the visual system output, and the controller is configured to be able to perform, as the intra-column cooperation processing, a side visual information cooperation processing of controlling the side output unit to output the visual information indicating a column identification information as a mark for specifying the column including the host vehicle.

According to still another aspect of the present invention, in the vehicle control system, it is possible to configured that the controller is configured to be able to perform a lane change processing in which, at the time when the entire column including the host vehicle performs lane change, the host vehicle starts lane change in the first place in the column in a case in which the host vehicle is the rearmost vehicle in the vehicle longitudinal direction in the column, and the host vehicle starts lane change after lane change of a succeeding vehicle following the host vehicle in a case in which the host vehicle is a preceding vehicle preceding the rearmost vehicle, in parallel with the intra-column cooperation processing.

According to still another aspect of the present invention, in a column traveling system, it is possible to configured that the vehicle control system and a plurality of the vehicle control systems that are respectively mounted on at least a plurality of vehicles in a column including the vehicles traveling as a group.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

The following describes an embodiment according to the present invention in detail based on the drawings. The present invention is not limited to the embodiment. Constituent elements in the following embodiment include a constituent element that can be replaced and easily conceivable by those skilled in the art, or substantially the same constituent element.

Embodiment

Figure 1:
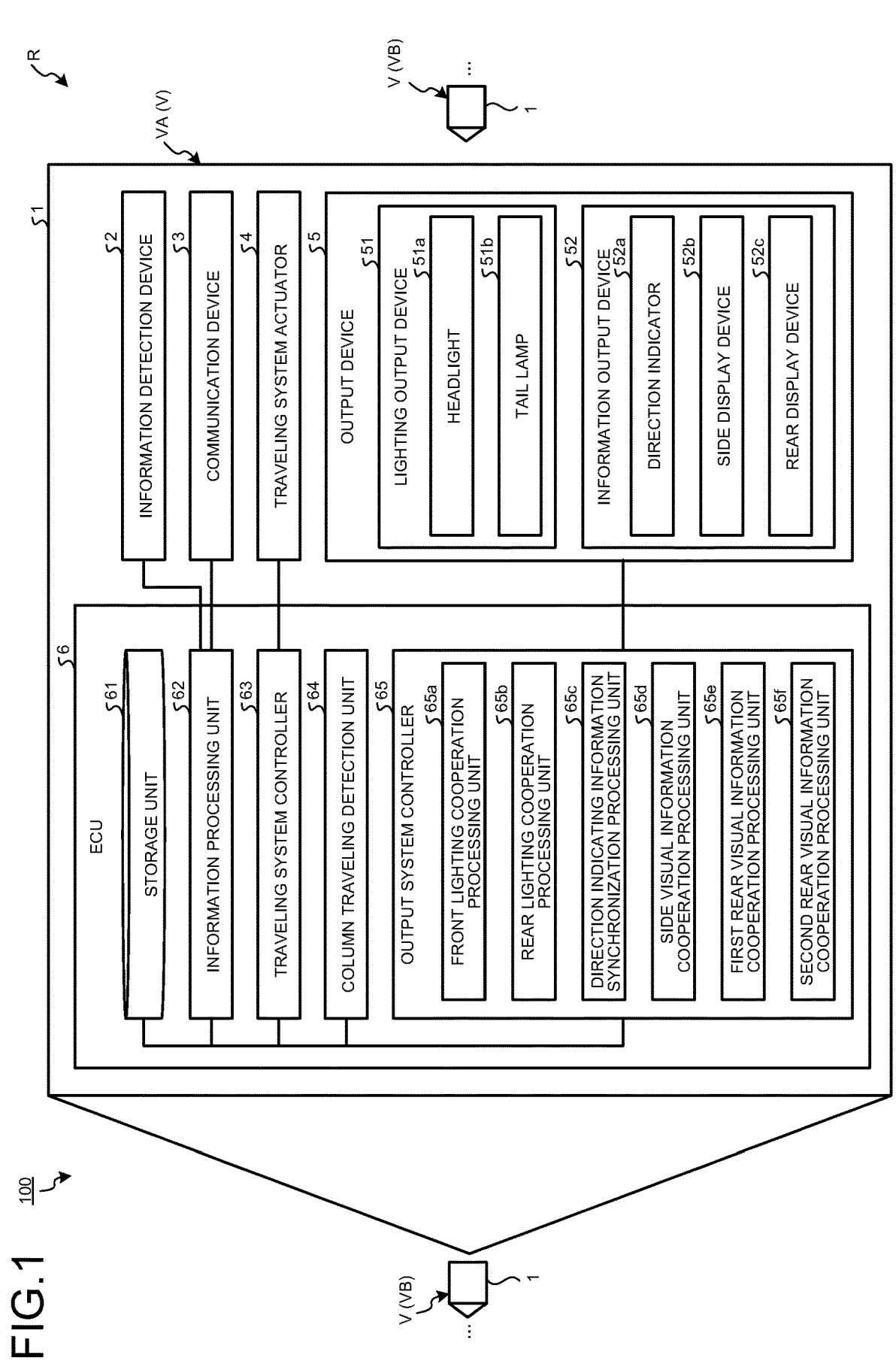
FIG. 1 is a block diagram illustrating a schematic configuration of a vehicle control system and a column traveling system according to an embodiment.

A column traveling system 100 according to the present embodiment illustrated in FIG. 1 is a system for implementing more appropriate column traveling based on a visual system output and the like that are output from a vehicle V to the outside by being applied to a column R, which is a group of a plurality of traveling vehicles V, to perform intra-column cooperation processing on the column R. The column traveling system 100 includes a plurality of vehicle control systems 1 that are respectively mounted on at least a plurality of vehicles V in the column R, and intra-column cooperation processing is performed by the vehicle control system 1. The following describes a configuration of the vehicle control system 1 in detail with reference to FIG. 1.

In the following description, the vehicles V included in the column R are assumed to be large-size vehicles such as a truck, but the embodiment is not limited thereto. Additionally, in the following description, one vehicle control system 1 is assumed to be typically mounted on each of all the vehicles V included in the column R, and the vehicle control system 1 is assumed to have a configuration common to all the vehicles V, but the embodiment is not limited thereto. For example, part of the configuration of the vehicle control system 1 is not necessarily common to some of the vehicles V included in the column R depending on content of the intra-column cooperation processing that is actually performed. For example, part of a configuration of an output device 5 (described later) is not necessarily disposed in some of the vehicles V. In the following description, for convenience of explanation, one of the vehicles V to which the vehicle control system 1 is applied in the column R is referred to as a host vehicle VA, and the vehicles V other than the host vehicle VA in the column R is referred to as the other vehicles VB in some cases. The following describes the vehicle control system 1 that is applied to the host vehicle VA, and the vehicle control system 1 applied to the other vehicle VB will not be described.

Specifically, the vehicle control system 1 is applied to the host vehicle VA as the vehicle V included in the column R, and performs intra-column cooperation processing during column traveling of the column R. The vehicle control system 1 includes an information detection device 2, a communication device 3 serving as a communication unit, a traveling system actuator 4, the output device 5 serving as an output unit, and an electronic controller (ECU) 6 serving as a controller. The vehicle control system 1 according to the present embodiment is implemented by mounting constituent elements illustrated in FIG. 1 on the host vehicle VA. Herein, as described above, the constituent elements of the vehicle control system 1 are mounted on the host vehicle VA, and the other vehicles VB in the column R that travel while being included in the column R as a group together with the host vehicle VA in common.

The information detection device 2 detects various kinds of information. Typically, the information detection device 2 detects various kinds of vehicle detection information including information used for column traveling. The information detection device 2 detects, as the vehicle detection information, vehicle state information and vehicle peripheral information, for example. That is, the vehicle detection information typically includes the vehicle state information, the vehicle peripheral information, and the like. The vehicle state information detected by the information detection device 2 may include, for example, information related to vehicle speed, acceleration (acceleration in a vehicle longitudinal direction, acceleration in a vehicle width direction, acceleration in a vehicle rolling direction, and the like), an steering angle, an operation amount of an accelerator pedal (an accelerator depressing amount), an operation amount of a brake pedal (a brake depressing amount), a shift position, whether a direction indicator (blinker) 52a is operated, and direction indicating information of the direction indicator 52a, of the host vehicle VA. The vehicle peripheral information detected by the information detection device 2 may include, for example, image information of a periphery of the host vehicle VA, external object information including presence of an external object on the periphery of the host vehicle VA, a relative distance to the external object, relative speed, Time-To-Collision (TTC), and the like, white line information of a lane on which the host vehicle VA travels, present position information (GPS information) of the host vehicle VA, and the like. The information detection device 2 includes a vehicle speed sensor, an acceleration sensor, a steering angle sensor, an accelerator sensor, a brake sensor, a shift position sensor, a blinker switch, and an imaging device such as a CCD camera, various kinds of radar and sonar using infrared rays, millimeter waves, ultrasonic waves, and the like, and various kinds of detectors such as a GPS receiver and various kinds of wireless communication devices for detecting pieces of the information described above. The information detection device 2 is electrically connected to the ECU 6, and outputs the detected vehicle detection information (the vehicle state information, the vehicle peripheral information) to the ECU 6.

The communication device 3 is disposed in the host vehicle VA, and can transmit/receive communication information to/from the other vehicles VB in the column R that travel while being included in the column R as a group together with the host vehicle VA. Communication targets that transmit/receive the communication information to/from the host vehicle VA via the communication device 3 typically include the other vehicle VB and the like positioned in a range of being able to communicate with the host vehicle VA before included in the column R in addition to the other vehicles VB in the column R. The communication device 3 includes a vehicle-to-vehicle communication device that can directly communicate with the other vehicle VB via various kinds of wireless communication schemes, a road-to-vehicle communication device that can indirectly communicate with the other vehicle VB via an on-road unit disposed on a traveling road on which the host vehicle VA travels, and the like. The communication device 3 may be configured to be able to communicate with the other vehicle VB via what is called the Internet. The communication device 3 is electrically connected to the ECU 6. The communication device 3 acquires, from the ECU 6, the communication information to be transmitted to the other vehicle VB (referred to as "host vehicle communication information" in some cases), and transmits the communication information to the other vehicle VB. The communication device 3 outputs, to the ECU 6, the communication information received from the other vehicle VB (referred to as "other vehicle communication information" in some cases). The communication information (host vehicle communication information) that is transmitted to the other vehicle VB via the communication device 3 may include, for example, vehicle identification information such as a car number and a vehicle ID with which the host vehicle VA can be discriminated from the other vehicle VB, the vehicle detection information detected by the information detection device 2, and vehicle control information related to control of various appliances mounted on the host vehicle VA such as the traveling system actuator 4 and the output device 5. On the other hand, the communication information (other vehicle communication information) that is received from the other vehicle VB via the communication device 3 may include, for example, the vehicle identification information, the vehicle detection information, and the vehicle control information of the other vehicle VB.

The traveling system actuator 4 is various kinds of appliances for causing the host vehicle VA to travel. The traveling system actuator 4 typically includes a power train for traveling serving as a drive device to cause the host vehicle VA to travel, a steering device for steering the host vehicle VA, a braking device for braking the host vehicle VA, and the like. The traveling system actuator 4 is electrically connected to the ECU 6, and respective units thereof are driven based on a control signal transmitted from the ECU 6.

The output device 5 is disposed in the host vehicle VA, and can output a visual system output related to the sense of sight to the outside of the host vehicle VA. The output device 5 according to the present embodiment includes a lighting output device 51 serving as a lighting output unit, and an information output device 52 serving as an information output unit. The lighting output device 51 and the information output device 52 included in the output device 5 are electrically connected to the ECU 6, and respective units thereof are driven based on a control signal transmitted from the ECU 6.

The lighting output device 51 outputs illumination light for lighting up the periphery of the host vehicle VA as a visual system output related to the sense of sight. In this case, the lighting output device 51 includes a headlight 51*a* (also refer to FIG. 3) and a tail lamp 51*b* (also refer to FIG. 3). The headlight 51*a* is a lighting fixture that is disposed at a front end part in the vehicle longitudinal direction (a direction along a straight advancing direction of the host vehicle VA) of the host vehicle VA, and outputs front illumination light for lighting up the front in the vehicle longitudinal direction of the host vehicle VA as the visual system output. The tail lamp 51*b* is a lighting fixture that is disposed at a rear end part in the vehicle longitudinal direction of the host vehicle VA, and outputs rear illumination light for lighting up the rear in the vehicle longitudinal direction of the host vehicle VA as the visual system output.

The information output device 52 outputs various kinds of visual information as the visual system output related to the sense of sight. In this case, the information output device 52 includes the direction indicator 52*a* (also refer to FIG. 4), a side display device 52*b* serving as a side output unit (also refer to FIG. 5, FIG. 6, and FIG. 7), and a rear display device 52*c* serving as a rear output unit (also refer to FIG. 8). A plurality of the direction indicators 52*a* are disposed on both sides in the vehicle width direction (a direction horizontally orthogonal to the vehicle longitudinal direction) of the host vehicle VA. The direction indicator 52*a* causes a signal lamp to be blinking-displayed to output, as the visual system output, the direction indicating information related to a moving direction of the host vehicle VA (the left side or the right side with respect to a traveling direction), and is also called a blinker. The side display device 52*b* is disposed on at least one side in the vehicle width direction of the host vehicle VA, in this case, disposed on both sides thereof, and outputs the visual information as the visual system output. The side display device 52*b* includes, for example, an image display device 52*ba* that displays an image and the like as the visual information (refer to FIG. 5 and FIG. 6), and a position light 52*bb* (refer to FIG. 7) that can output a plurality of pieces of light having different colors as the visual information. The image display device 52*ba* and the position light 52*bb* are disposed on a surface on a lateral side in the vehicle width direction of the host vehicle VA, for example, a side surface of a load-carrying platform. The rear display device 52*c* is disposed in the rear in the vehicle longitudinal direction of the host vehicle VA, and outputs the visual information as the visual system output. The rear display device 52*c* includes, for example, an image display device 52*ca* (refer to FIG. 8) that displays an image and the like as the visual information. The image display device 52*ca* is disposed on a surface on the rear side in the vehicle longitudinal direction of the host vehicle VA, for example, a back surface of a load-carrying platform.

The ECU 6 integrally controls the respective units of the vehicle control system 1, and performs various kinds of processing including intra-column cooperation processing during column traveling of the column R. The ECU 6 includes, for example, a central processing unit such as a central processing unit (CPU), a micro processing unit (MPU), an application specific integrated circuit (ASIC), and a field programmable gate array (FPGA), and an electronic circuit mainly including a well-known microcomputer with a read only memory (ROM), a random access memory (RAM), and an interface. The ECU 6 conceptually includes functional blocks as a storage unit 61, an information processing unit 62, a traveling system controller 63, a column traveling detection unit 64, and an output system controller 65. Each of the storage unit 61, the information processing unit 62, the traveling system controller 63, the column traveling detection unit 64, and the output system controller 65 gives/receives various electric signals and various kinds of information to/from various appliances electrically connected thereto.

The storage unit 61 is a storage device such as a memory, and stores information, data, various computer programs, and the like required for various kinds of processing performed by the ECU 6. The storage unit 61 also stores the vehicle identification information, the vehicle detection information detected by the information detection device 2 (the vehicle state information, the vehicle peripheral information), the vehicle control information related to control of the traveling system actuator 4, the output device 5, and the like performed by the traveling system controller 63, the output system controller 65, and the like, and the communication information received from the other vehicle VB by the communication device 3 (other vehicle communication information). These pieces of information are read out by the information processing unit 62, the traveling system controller 63, the column traveling detection unit 64, the output system controller 65, and the like from the storage unit 61 as needed.

The information processing unit 62 is a portion that is interposed between the storage unit 61, and the information detection device 2 and the communication device 3, and has a function of being able to perform processing such as acquiring, storing, and reading out various kinds of information related to the host vehicle VA. The information processing unit 62 executes a control program stored in the storage unit 61 to perform various kinds of processing such as acquiring, storing, and reading out various kinds of information related to the host vehicle VA. The information processing unit 62 is electrically connected to the communication device 3, the information detection device 2, and the like via the interface, and acquires the vehicle detection information (the vehicle state information, the vehicle peripheral information) and the communication information (other vehicle communication information) from the information detection device 2 and the communication device 3 to be stored in the storage unit 61. The information processing unit 62 reads out the vehicle identification information, the vehicle detection information, the vehicle control information, and the like stored in the storage unit 61 as needed, and outputs the vehicle identification information, the vehicle detection information, the vehicle control information, and the like to the communication device 3 and the like as the communication information (host vehicle communication information).

The traveling system controller 63 is a portion that is electrically connected to the traveling system actuator 4 via the interface, and has a function of being able to perform various kinds of processing for controlling driving of the traveling system actuator 4 to cause the host vehicle VA to travel. The traveling system controller 63 executes a control program stored in the storage unit 61 to output a control signal to the traveling system actuator 4, and performs various kinds of processing for controlling driving of the traveling system actuator 4 to cause the host vehicle VA to travel. The traveling system controller 63 according to the present embodiment can perform column traveling processing for implementing column traveling by reading out the vehicle detection information and the communication information (other vehicle communication information) stored in the storage unit 61, and outputting a control signal to the traveling system actuator 4 based on the vehicle detection information, the communication information, and the like to control driving of the traveling system actuator 4.

For example, when a start condition is established, the start condition being set in advance based on the vehicle detection information, the communication information (other vehicle communication information), and the like, the traveling system controller 63 controls the traveling system actuator 4 to perform the column traveling processing, and performs column traveling with the column R including the host vehicle VA. In this case, the column traveling processing performed by the traveling system controller 63 is processing of causing the host vehicle VA and the other vehicles VB to be in a line in the vehicle longitudinal direction (traveling direction) to form the column R as a group, and causing a succeeding vehicle to follow a head vehicle to perform column traveling while maintaining a target inter-vehicle distance and a target inter-vehicle time in the column R.

For example, as the start condition for the column traveling processing, various known conditions may be combined to be used, such as the condition that the communication information can be transmitted/received to/from the other vehicle VB as a candidate for the column R, the condition that the host vehicle VA and the other vehicle VB come close to each other to be at predetermined positions with respect to the traveling direction (for example, the positions at which each of a relative distance, relative speed, TTC, and the like is equal to or smaller than a threshold), the condition that a combination of the vehicle identification information of the host vehicle VA and the vehicle identification information of the other vehicle VB can constitute the column R, and the condition that an operation of starting column traveling is performed in response to a manual operation performed by a driver of the host vehicle VA. When the start condition for the column traveling processing is established, for example, the traveling system controller 63 may generate the vehicle control information indicating to start column traveling to be stored in the storage unit 61, transmit the communication information (host vehicle communication information) including the vehicle control information to the other vehicle VB included in the column R via the communication device 3, and start the column traveling processing to add the host vehicle VA to the column R. Alternatively, in a case of receiving the communication information (other vehicle communication information) including the vehicle control information indicating to start column traveling via the communication device 3 from a master vehicle of the column R set in advance (for example, the vehicle V as a head vehicle of the column R), in other words, in a case of receiving a column traveling start command, the traveling system controller 63 may start the column traveling processing to add the host vehicle VA to the column R.

On the other hand, as an end condition for the column traveling processing, for example, various known conditions may be combined to be used, such as the condition that the communication information cannot be transmitted/received to/from the other vehicle VB included in the column R, the condition that the host vehicle VA and the other vehicle VB are separated from each other to be at predetermined positions with respect to the traveling direction (for example, the positions at which each of the relative distance, the relative speed, the TTC, and the like is larger than the threshold), and the condition that an operation of canceling column traveling is performed in response to a manual operation performed by the driver of the host vehicle VA. When the end condition for the column traveling processing is established, for example, the traveling system controller 63 may generate the vehicle control information indicating to cancel column traveling to be stored in the storage unit 61, transmit the communication information (host vehicle communication information) including the vehicle control information to the other vehicle VB included in the column R via the communication device 3, and end the column traveling processing to cause the host vehicle VA to leave the column R. Alternatively, in a case of receiving the communication information (other vehicle communication information) including the vehicle control information indicating to cancel column traveling via the communication device 3 from the master vehicle of the column R set in advance, in other words, in a case of receiving a column traveling end command, the traveling system controller 63 may end the column traveling processing to cause the host vehicle VA to leave the column R.

Control target values such as the target inter-vehicle distance and the target inter-vehicle time for the column traveling processing performed by the traveling system controller 63 are calculated based on the vehicle detection information and the communication information, for example. In this case, for example, the traveling system controller 63 may calculate the control target values based on the vehicle detection information and the communication information (other vehicle communication information) stored in the storage unit 61, and perform the column traveling processing based on the control target values. In this case, the traveling system controller 63 may cause the calculated control target values to be stored in the storage unit 61 as the vehicle control information. Alternatively, for example, the traveling system controller 63 may perform the column traveling processing based on the control target values for each vehicle V that are collectively calculated by the traveling system controller 63 of the master vehicle in the column R set in advance. In this case, the traveling system controller 63 of the master vehicle collectively calculates the control target values for each vehicle V based on the vehicle detection information and the like of each vehicle V in the column R compiled as the communication information, and causes the calculated control target values for each vehicle V to be stored in the storage unit 61 of the master vehicle as the vehicle control information. The traveling system controller 63 of the host vehicle VA then receives the communication information (other vehicle communication information) including the vehicle control information from the master vehicle via the communication device 3, and performs the column traveling processing based on the control target values included in the vehicle control information. That is, the traveling system controller 63 may perform the column traveling processing based on the control target values that are individually calculated based on the vehicle detection information, the communication information (other vehicle communication information), and the like by the host vehicle VA, or perform the column traveling processing based on the control target values that are collectively calculated by the master vehicle based on the vehicle detection information and the like of each vehicle V and received via the communication device 3. Additionally, column traveling of the column R including a group of vehicles V may be implemented when a plurality of the traveling system controllers 63 of the respective vehicles V cooperate with each other and a traveling state of a succeeding vehicle is controlled in accordance with the traveling state of a preceding vehicle, or column traveling may be implemented when the traveling system controllers 63 of the respective vehicles V are integrally managed to cooperate with each other by the traveling system controller 63 of the master vehicle.

With column traveling of the column R as described above, air resistance of the succeeding vehicle following the preceding vehicle can be reduced by putting the vehicles to be close to each other to achieve the target inter-vehicle distance and the target inter-vehicle time for the column R as a group including the host vehicle VA and the other vehicles VB, so that fuel efficiency of the succeeding vehicle can be improved, and traffic congestion can be relieved, for example. Column traveling that is implemented when the traveling system controller 63 performs the column traveling processing may be performed when behavior of the host vehicle VA is controlled in accordance with a driving operation performed by the driver of the host vehicle VA, may be performed when behavior of the host vehicle VA is automatically controlled in parallel with the driving operation performed by the driver, or may be performed when behavior of the host vehicle VA is completely automatically controlled without the driving operation performed by the driver. For example, column traveling of the column R may be performed such that the driver manually performs a driving operation on the head vehicle in the column R, and the succeeding vehicle after the head vehicle may be automatically driven in parallel with the driving operation performed by the driver, or may be completely automatically driven without the driving operation performed by the driver.

The column traveling detection unit 64 is a portion having a function of being able to perform various kinds of processing for detecting the fact that the host vehicle VA is performing column traveling. The column traveling detection unit 64 executes a control program stored in the storage unit 61 to perform various kinds of processing for detecting the fact that the host vehicle VA is performing column traveling. For example, the column traveling detection unit 64 determines whether the host vehicle VA is performing column traveling, and detects the fact that the host vehicle VA is performing column traveling by determining whether the start condition for the column traveling processing is established or whether the end condition for the column traveling processing is established based on the vehicle detection information, the vehicle control information, the communication information (other vehicle communication information), and the like stored in the storage unit 61.

The output system controller 65 is a portion that is electrically connected to the output device 5 via the interface, and has a function of being able to perform various kinds of processing for controlling driving of the output device 5 and outputting the visual system output related to the sense of sight to the outside of the host vehicle VA. The output system controller 65 executes a control program stored in the storage unit 61 to perform various kinds of processing for outputting a control signal to the output device 5, and controlling driving of the output device 5 to output the visual system output. The output system controller 65 according to the present embodiment can perform intra-column cooperation processing for controlling the output device 5 to cause the visual system outputs that are output by the output device 5 to cooperate with each other in the entire column R based on the communication information that is transmitted/received to/from the other vehicle VB via the communication device 3. In a case in which the host vehicle VA is performing column traveling while being included in the column R, the output system controller 65 transmits/receives the communication information to/from the other vehicles VB included in the column R via the communication device 3 to perform the intra-column cooperation processing.

For example, the output system controller 65 may grasp the position of the host vehicle VA in the column R based on the vehicle detection information and the communication information (other vehicle communication information) stored in the storage unit 61, and causes the host vehicle VA to cooperate with the other vehicle VB in the column R in accordance with the position of the host vehicle VA in the column R to perform the intra-column cooperation processing. For example, the output system controller 65 may perform the intra-column cooperation processing based on the positions of the respective vehicles V in the column R that are collectively grasped by the output system controller 65 of the master vehicle in the column R set in advance. In this case, the output system controller 65 of the master vehicle collectively specifies the positions of the respective vehicles V in the column R based on the vehicle detection information and the like of the respective vehicles V in the column R that are compiled as the communication information, and causes the information related to the specified positions of the respective vehicles V in the column R to be stored in the storage unit 61 of the master vehicle as the vehicle control information. The output system controller 65 of the host vehicle VA then receives the communication information (other vehicle communication information) including the vehicle control information from the master vehicle via the communication device 3, and performs the intra-column cooperation processing based on the information related to the position of the host vehicle VA in the column R included in the vehicle control information. That is, the output system controller 65 may perform the intra-column cooperation processing based on the position of the host vehicle VA in the column R that is individually specified based on the vehicle detection information, the communication information (other vehicle communication information), and the like in the host vehicle VA, or may perform the intra-column cooperation processing based on the information related to the position of the host vehicles VA in the column R that is collectively specified by the master vehicle based on the vehicle detection information and the like of each vehicle V and received via the communication device 3. In all cases, the output system controller 65 performs the intra-column cooperation processing based on the position of the host vehicle VA in the column R that is grasped based on the communication information and the like transmitted/received via the communication device 3. Additionally, for the column R including a group of the vehicles V, the intra-column cooperation processing may be performed by each vehicle V when a plurality of the output system controllers 65 of the respective vehicles V cooperate with each other and the traveling state of the succeeding vehicle is controlled in accordance with the traveling state of the preceding vehicle, or the intra-column cooperation processing may be implemented by each vehicle V when the output system controllers 65 of the respective vehicles V are integrally managed to cooperate with each other by the output system controller 65 of the master vehicle.

Figure 2:
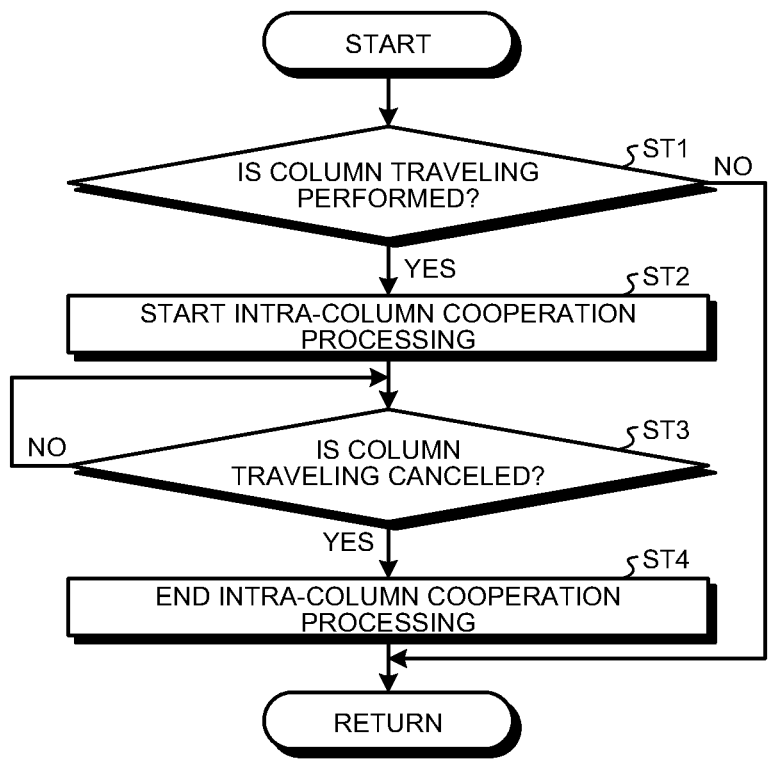
FIG. 2 is a flowchart for explaining processing during column traveling performed by the vehicle control system according to the embodiment.

The following describes an example of the processing during column traveling performed by the vehicle control system 1 with reference to the flowchart in FIG. 2, and describes an example of the intra-column cooperation processing in detail using a plurality of specific examples thereafter. These control routines are repeatedly performed in control cycles of several milliseconds or several tens of milliseconds (in units of a clock).

First, the column traveling detection unit 64 of the ECU 6 determines whether the host vehicle VA is performing column traveling (Step ST1). The column traveling detection unit 64 determines whether the host vehicle VA is performing column traveling by determining whether the start condition for the column traveling processing is established and whether the end condition for the column traveling processing is established based on the vehicle detection information, the vehicle control information, the communication information (other vehicle communication information), and the like stored in the storage unit 61. If the column traveling detection unit 64 determines that the host vehicle VA is not performing column traveling (No at Step ST1), the ECU 6 ends the present control cycle, and advances the process to the next control cycle.

If the column traveling detection unit 64 determines that the host vehicle VA is performing column traveling (Yes at Step ST1), the output system controller 65 of the ECU 6 grasps the position of the host vehicle VA in the column R based on the vehicle detection information and the communication information (other vehicle communication information) stored in the storage unit 61, and starts the intra-column cooperation processing in accordance with the position of the host vehicle VA in the column R (Step ST2).

Next, the column traveling detection unit 64 determines whether column traveling of the host vehicle VA is canceled (Step ST3). The column traveling detection unit 64 determines whether column traveling of the host vehicle VA is canceled by determining whether the start condition for the column traveling processing is established or whether the end condition for the column traveling processing is established based on the vehicle detection information, the vehicle control information, the communication information (other vehicle communication information), and the like stored in the storage unit 61. If it is determined that column traveling of the host vehicle VA is not canceled, that is, column traveling of the host vehicle VA is continued (No at Step ST3), the column traveling detection unit 64 repeatedly performs determination at Step ST3 until it is determined that column traveling of the host vehicle VA is canceled. During this process, the output system controller 65 continues the intra-column cooperation processing.

If the column traveling detection unit 64 determines that column traveling of the host vehicle VA is canceled (Yes at Step ST3), the output system controller 65 ends the intra-column cooperation processing (Step ST4), ends the present control cycle, and advances the process to the next control cycle.

Next, with reference to FIG. 3, FIG. 4, FIG. 5, FIG. 6, FIG. 7, FIG. 8, FIG. 9, and FIG. 10, the following describes an example of the intra-column cooperation processing in detail using a plurality of specific examples. In the following description, as the intra-column cooperation processing performed by the output system controller 65, exemplified are front lighting cooperation processing and rear lighting cooperation processing illustrated in FIG. 3, direction indicating information synchronization processing illustrated in FIG. 4, side visual information cooperation processing illustrated in FIG. 5, FIG. 6, and FIG. 7, first rear visual information cooperation processing illustrated in FIG. 8 and FIG. 9, and second rear visual information cooperation processing illustrated in FIG. 8 and FIG. 10, but the embodiment is not limited thereto. To perform pieces of the processing described above, the output system controller 65 conceptually includes functional blocks as a front lighting cooperation processing unit 65a, a rear lighting cooperation processing unit 65b, a direction indicating information synchronization processing unit 65c, a side visual information cooperation processing unit 65d, a first rear visual information cooperation processing unit 65e, and a second rear visual information cooperation processing unit 65f.

Figure 3:
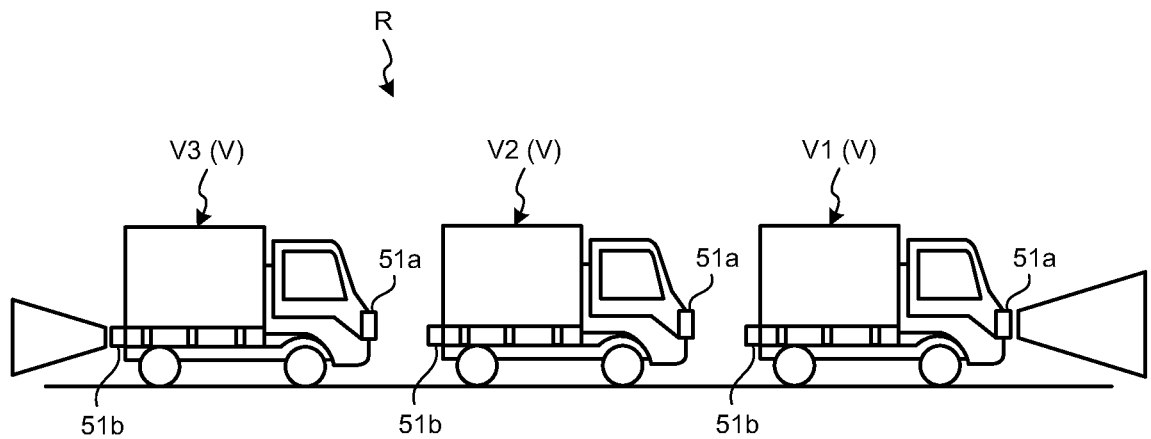
FIG. 3 is a schematic diagram for explaining front lighting cooperation processing and rear lighting cooperation processing as an example of intra-column cooperation processing performed by the vehicle control system according to the embodiment.

The front lighting cooperation processing and the rear lighting cooperation processing illustrated in FIG. 3 are lighting cooperation processing for controlling the lighting output device 51 to cause pieces of illumination light to cooperate with each other in the entire column R. The lighting cooperation processing is performed by the front lighting cooperation processing unit 65a and the rear lighting cooperation processing unit 65b. That is, the front lighting cooperation processing unit 65a and the rear lighting cooperation processing unit 65b function as lighting cooperation processing units that perform the lighting cooperation processing as the intra-column cooperation processing. Due to this, the vehicle control system 1 assumes the group of vehicles V included in the column R to be a cluster of vehicles, causes the vehicles to cooperate with each other in the entire column R, and outputs illumination light from the lighting output device 51 as the visual system output.

More specifically, the front lighting cooperation processing unit 65a performs the front lighting cooperation processing as the intra-column cooperation processing. As illustrated in FIG. 3, the front lighting cooperation processing is processing of controlling the headlight 51a to output front illumination light in a case in which the host vehicle VA is a head vehicle V1 in the vehicle longitudinal direction in the column R, and controlling the headlight 51a to be in a lighting-OFF state in a case in which the host vehicle VA is a succeeding vehicle V2 or V3 following the head vehicle V1 in the column R. As described above, the front lighting cooperation processing unit 65a grasps the position of the host vehicle VA in the column R based on the vehicle detection information and the communication information (other vehicle communication information) stored in the storage unit 61, and performs the front lighting cooperation processing in accordance with the position of the host vehicle VA in the column R.

The rear lighting cooperation processing unit 65b performs the rear lighting cooperation processing as the intra-column cooperation processing. As illustrated in FIG. 3, the rear lighting cooperation processing is processing of controlling the tail lamp 51b to output rear illumination light in a case in which the host vehicle VA is the rearmost vehicle V3 in the vehicle longitudinal direction in the column R, and controlling the tail lamp 51b to be in a lighting-OFF state in a case in which the host vehicle VA is the preceding vehicle V1 or V2 preceding the rearmost vehicle V3 in the column R. The rear lighting cooperation processing unit 65b grasps the position of the host vehicle VA in the column R based on the vehicle detection information and the communication information (other vehicle communication information) stored in the storage unit 61, and performs the rear lighting cooperation processing in accordance with the position of the host vehicle VA in the column R.

Figure 4:
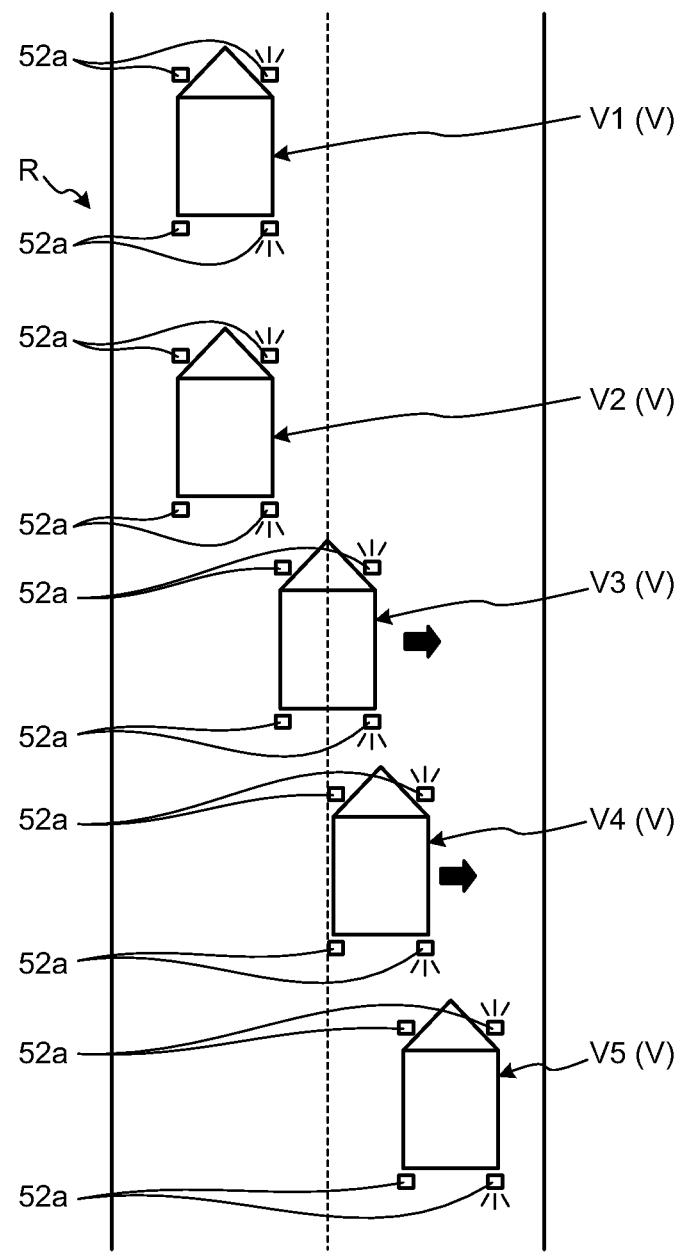
FIG. 4 is a schematic diagram for explaining direction indicating information synchronization processing as an example of the intra-column cooperation processing performed by the vehicle control system according to the embodiment.
Figure 5:
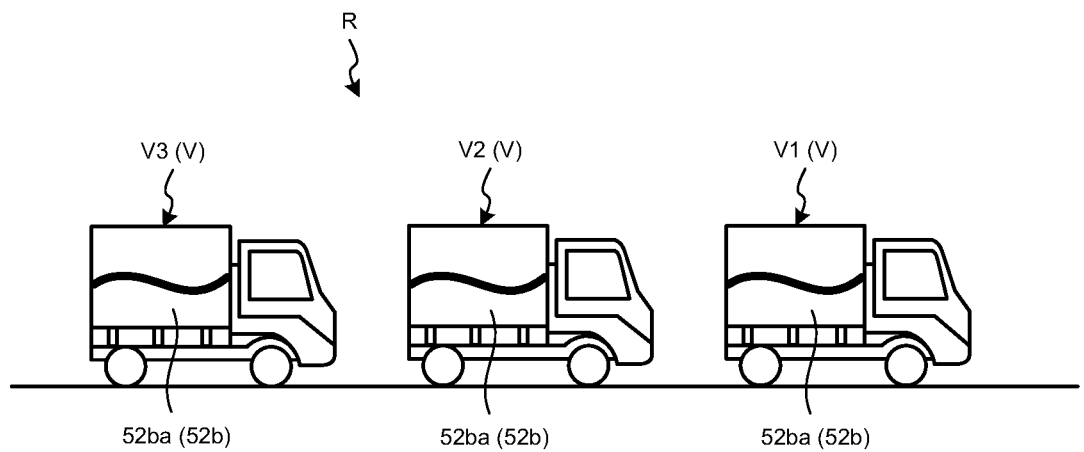
FIG. 5 is a schematic diagram for explaining side visual information cooperation processing as an example of the intra-column cooperation processing performed by the vehicle control system according to the embodiment.
Figure 6:
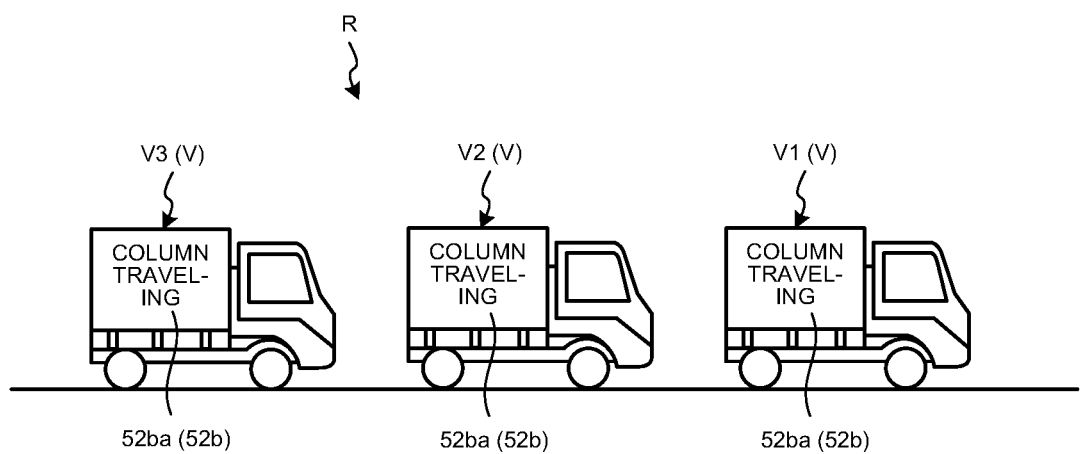
FIG. 6 is a schematic diagram for explaining another example of the side visual information cooperation processing as an example of the intra-column cooperation processing performed by the vehicle control system according to the embodiment.
Figure 7:
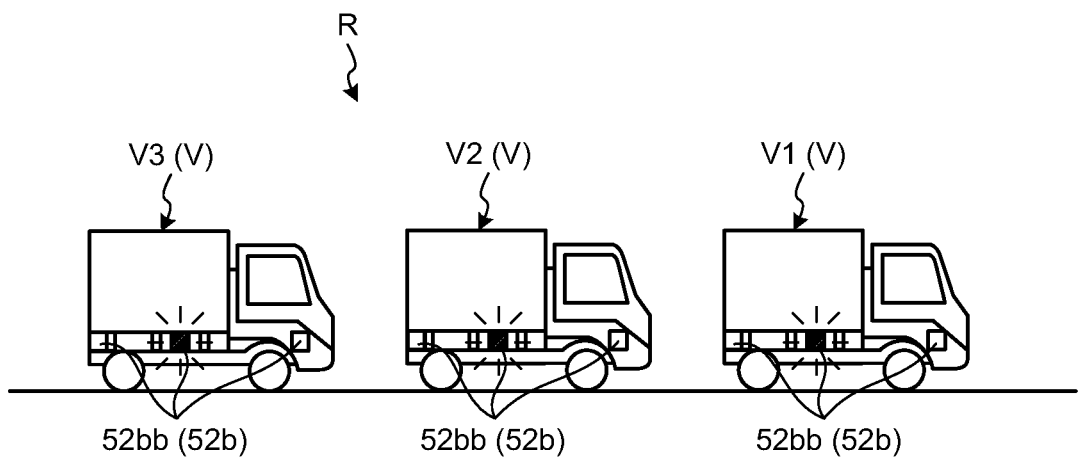
FIG. 7 is a schematic diagram for explaining yet another example of the side visual information cooperation processing as an example of the intra-column cooperation processing performed by the vehicle control system according to the embodiment.
Figure 8:
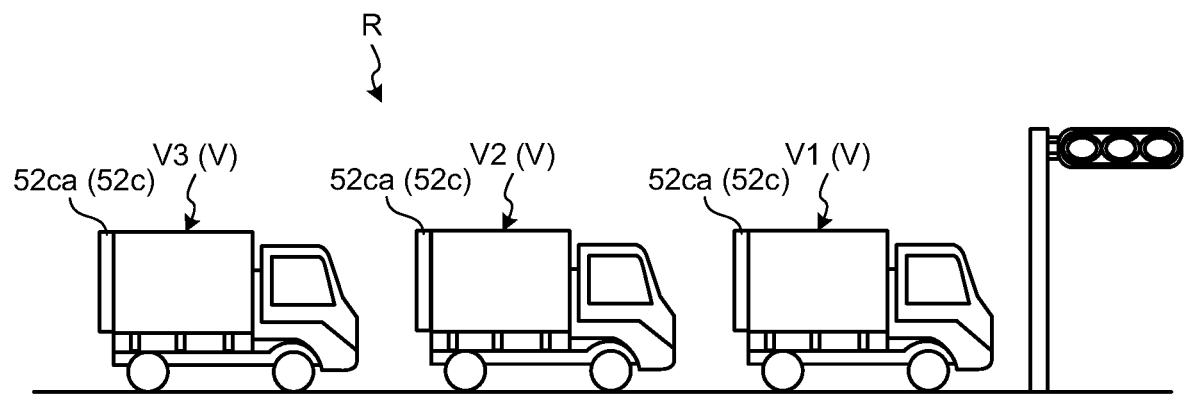
FIG. 8 is a schematic diagram for explaining first rear visual information cooperation processing and second rear visual information cooperation processing as an example of the intra-column cooperation processing performed by the vehicle control system according to the embodiment.
Figure 9:
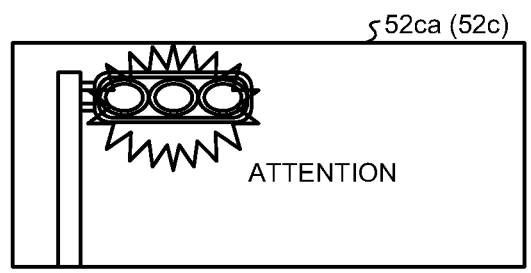
FIG. 9 is a schematic diagram for explaining the first rear visual information cooperation processing as an example of the intra-column cooperation processing performed by the vehicle control system according to the embodiment.
Figure 10:
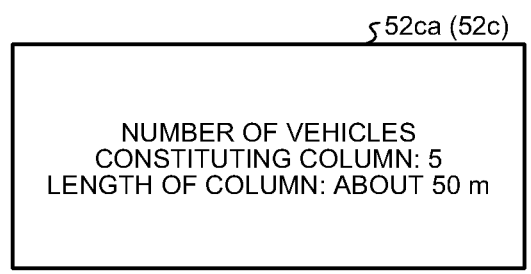
FIG. 10 is a schematic diagram for explaining the second rear visual information cooperation processing as an example of the intra-column cooperation processing performed by the vehicle control system according to the embodiment.

The direction indicating information synchronization processing illustrated in FIG. 4, the side visual information cooperation processing illustrated in FIG. 5, FIG. 6, and FIG. 7, the first rear visual information cooperation processing illustrated in FIG. 8 and FIG. 9, and the second rear visual information cooperation processing illustrated in FIG. 8 and FIG. 10 are output information cooperation processing for controlling the information output device 52 to cause pieces of the visual information to cooperate with each other in the entire column R. The output information cooperation processing is performed by the direction indicating information synchronization processing unit 65c, the side visual information cooperation processing unit 65d, the first rear visual information cooperation processing unit 65e, and the second rear visual information cooperation processing unit 65f. That is, the direction indicating information synchronization processing unit 65c, the side visual information cooperation processing unit 65d, the first rear visual information cooperation processing unit 65e, and the second rear visual information cooperation processing unit 65f function as output information cooperation processing units that perform the output information cooperation processing as the intra-column cooperation processing. Due to this, the vehicle control system 1 assumes the group of vehicles V included in the column R to be a cluster of vehicles, causes the vehicles to cooperate with each other in the entire column R, and outputs the visual information from the information output device 52 as the visual system output.

More specifically, the direction indicating information synchronization processing unit 65c performs the direction indicating information synchronization processing as the intra-column cooperation processing. As illustrated in FIG. 4, the direction indicating information synchronization processing is processing of controlling the direction indicator 52a to synchronize an output timing of the direction indicating information with an output timing of the other vehicle direction indicating information as the direction indicating information output by the other vehicle VB in the column R, and to output the direction indicating information indicating the same direction as a moving direction of the other vehicle VB indicated by the other vehicle direction indicating information. In this case, for example, the direction indicating information synchronization processing unit 65c controls the direction indicator 52a so that the same moving direction is indicated by the direction indicating information in the group of vehicles V1, V2, V3, V4, and V5 in the column R including the host vehicle VA and the other vehicles VB based on the vehicle detection information and the communication information (other vehicle communication information) stored in the storage unit 61. As described above, the direction indicating information synchronization processing unit 65c then grasps the position of the host vehicle VA in the column R based on the vehicle detection information and the communication information (other vehicle communication information) stored in the storage unit 61, and synchronizes output timings at which the direction indicating information is output from the direction indicator 52a in accordance with the position of the host vehicle VA in the column R. In this case, for example, the direction indicating information synchronization processing unit 65c may synchronize the output timings by causing all the output timings of the direction indicating information to be the same for the group of vehicles V1, V2, V3, V4, and V5 in the column R including the host vehicle VA and the other vehicles VB. Alternatively, for example, the direction indicating information synchronization processing unit 65c may synchronize the output timings so that the direction indicating information output from the direction indicator 52a seems to continuously flow from the vehicle V1 side to the vehicle V5 side, or from the vehicle V5 side to the vehicle V1 side for the group of vehicles V1, V2, V3, V4, and V5 in the column R including the host vehicle VA and the other vehicles VB. The direction indicating information synchronization processing unit 65c performs the direction indicating information synchronization processing as described above.

Additionally, the direction indicating information synchronization processing unit 65c may perform the intra-column cooperation processing, in this case, the direction indicating information synchronization processing in parallel with lane change processing performed by the traveling system controller 63. The lane change processing performed by the traveling system controller 63 is processing that is performed when the entire column R including the host vehicle VA performs lane change. In the lane change processing, as illustrated in FIG. 4, in a case in which the host vehicle VA is the rearmost vehicle V5 in the vehicle longitudinal direction in the column R, the traveling system controller 63 controls the traveling system actuator 4 to start lane change in the first place in the column R. In the lane change processing, as illustrated in FIG. 4, in a case in which the host vehicle VA is the preceding vehicle V1, V2, V3, or V4 preceding the rearmost vehicle V5, the traveling system controller 63 controls the traveling system actuator 4 to start lane change after the lane change of the succeeding vehicle following the host vehicle VA (for example, the vehicle V5 in a case in which the host vehicle VA is the vehicle V4). In this case, the traveling system controller 63 may perform the lane change processing in parallel with the direction indicating information synchronization processing performed by the direction indicating information synchronization processing unit 65c described above. In the example of FIG. 4, described is a case in which the traveling system controller 63 performs the lane change processing in parallel with the direction indicating information synchronization processing, but the embodiment is not limited thereto. The traveling system controller 63 may perform the lane change processing in parallel with the intra-column cooperation processing (the front lighting cooperation processing, the rear lighting cooperation processing, the side visual information cooperation processing, the first rear visual information cooperation processing, the second rear visual information cooperation processing, and the like) other than the direction indicating information synchronization processing.

The side visual information cooperation processing unit 65d performs the side visual information cooperation processing as the intra-column cooperation processing. As illustrated in FIG. 5, FIG. 6, and FIG. 7, the side visual information cooperation processing is processing of controlling the side display device 52b to output the visual information indicating column identification information as a mark for specifying the column R including the host vehicle VA. For example, the side visual information cooperation processing unit 65d controls the side display device 52b so that pieces of the column identification information as marks for specifying the column R become the same for the group of vehicles V1, V2, and V3 in the column R including the host vehicle VA and the other vehicles VB based on the vehicle identification information and the communication information (other vehicle communication information) stored in the storage unit 61. In the side visual information cooperation processing illustrated in FIG. 5, in the group of vehicles V1, V2, and V3 in the column R including the host vehicle VA and the other vehicles VB, the side visual information cooperation processing unit 65d causes a plurality of the image display devices 52ba respectively included in a plurality of the side display devices 52b to display the same motif, in this case, an image of a visually continuous wave line as the visual information indicating the column identification information. In the side visual information cooperation processing illustrated in FIG. 6, in the group of vehicles V1, V2, and V3 in the column R including the host vehicle VA and the other vehicles VB, the side visual information cooperation processing unit 65d causes the image display devices 52ba included in the respective side display devices 52b to display a character image of "column traveling" as the visual information indicating the column identification information. Additionally, in the side visual information cooperation processing illustrated in FIG. 7, in the group of vehicles V1, V2, and V3 in the column R including the host vehicle VA and the other vehicles VB, the side visual information cooperation processing unit 65d causes a plurality of the position lights 52bb included in the respective side display devices 52b to output light of the same color as the visual information indicating the column identification information. The side visual information cooperation processing unit 65d performs the side visual information cooperation processing as described above.

The first rear visual information cooperation processing unit 65e performs the first rear visual information cooperation processing as the intra-column cooperation processing. As illustrated in FIG. 8 and FIG. 9, the first rear visual information cooperation processing is processing of controlling the rear display device 52c to output visual information indicating information of traffic lights and a sign on a front side in the vehicle longitudinal direction that is imaged by the head vehicle V1 in the vehicle longitudinal direction in the column R in a case in which the host vehicle VA is the rearmost vehicle V3 in the vehicle longitudinal direction in the column R. In a case in which the host vehicle VA is the rearmost vehicle V3, for example, the first rear visual information cooperation processing unit 65e extracts, as the information of traffic lights and a sign, an image including traffic lights or a sign from the image information of the front side in the vehicle longitudinal direction of the head vehicle V1 included in the communication information based on the communication information (other vehicle communication information) stored in the storage unit 61. As illustrated in FIG. 9, the first rear visual information cooperation processing unit 65e causes the image display device 52ca included in the rear display device 52c to display the image including traffic lights or a sign as the visual information indicating the information of traffic lights and a sign based on the extracted information of traffic lights and a sign. In this case, the first rear visual information cooperation processing unit 65e may cause the image display device 52ca to display, as the visual information indicating the information of traffic lights and a sign, an image emphasizing traffic lights or a sign such as a character image of "attention" or a figure image emphasizing a yellow light of traffic lights for calling attention as exemplified in FIG. 9 in addition to the image including traffic lights or a sign. The first rear visual information cooperation processing unit 65e performs the first rear visual information cooperation processing as described above.

The second rear visual information cooperation processing unit 65f performs the second rear visual information cooperation processing as the intra-column cooperation processing. As illustrated in FIG. 8 and FIG. 10, the second rear visual information cooperation processing is processing of controlling the rear display device 52c to output visual information indicating column configuration information related to the column R including the host vehicle VA in a case in which the host vehicle VA is the rearmost vehicle V3 in the vehicle longitudinal direction in the column R. In a case in which the host vehicle VA is the rearmost vehicle V3, for example, the second rear visual information cooperation processing unit 65f specifies the configuration of the column R to generate the column configuration information based on the communication information (other vehicle communication information) stored in the storage unit 61. For example, the second rear visual information cooperation processing unit 65f specifies the number of vehicles included in the column R, a length in the vehicle longitudinal direction (traveling direction) of the column R, and the like as the configuration of the column R to generate the column configuration information. The column configuration information may be information that is generated by the master vehicle in the column R set in advance, and received as the communication information (other vehicle communication information). As illustrated in FIG. 10, the second rear visual information cooperation processing unit 65f then causes the image display device 52ca included in the rear display device 52c to display a character image representing the number of vehicles included in the column R and the length of the column R as the visual information indicating the column configuration information based on the column configuration information. The column configuration information may include a working state of a braking device in the column R, a destination of the column R, cruising speed of the entire column R, an arrival time at the destination of the column R, and the like in addition to the number of vehicles included in the column R and the length of the column R. The second rear visual information cooperation processing unit 65f performs the second rear visual information cooperation processing as described above.

The vehicle control system 1 and the column traveling system 100 described above perform the intra-column cooperation processing such that the ECU 6 controls the output device 5 based on the communication information transmitted/received to/from the other vehicle VB via the communication device 3 to cause the visual system outputs output by the output device 5 to cooperate with each other in the entire column R including the host vehicle VA. Thus, the vehicle control system 1 and the column traveling system 100 can cause the visual system outputs that are output by the output device 5 to cooperate with each other in the entire column R in accordance with column traveling of the column R, so that appropriate column traveling is enabled to be performed while the group of vehicles V included in the column R are recognized as a cluster of vehicles.

More specifically, with the vehicle control system 1 and the column traveling system 100 described above, when the ECU 6 performs the lighting cooperation processing as the intra-column cooperation processing, the group of vehicles V included in the column R are assumed to be a cluster of vehicles to cooperate with each other in the entire column R, and illumination light as the visual system output can be output from the lighting output device 51 included in the output device 5. Thus, the vehicle control system 1 and the column traveling system 100 can output illumination light as the visual system output while assuming the group of vehicles V included in the column R to be a cluster of vehicles in accordance with column traveling of the column R, so that appropriate illumination light corresponding to column traveling of the column R can be obtained.

In the vehicle control system 1 and the column traveling system 100 described above, when the ECU 6 performs the output information cooperation processing as the intra-column cooperation processing, the group of vehicles V included in the column R are assumed to be a cluster of vehicles to cooperate with each other in the entire column R, and the visual information as the visual system output can be output from the information output device 52 included in the output device 5. Thus, the vehicle control system 1 and the column traveling system 100 can output the visual information as the visual system output while assuming the group of vehicles V included in the column R to be a cluster of vehicles in accordance with column traveling of the column R, so that appropriate visual information corresponding to column traveling of the column R can be obtained.

Specifically, the vehicle control system 1 and the column traveling system 100 described above can cause pieces of the front illumination light to cooperate with each other in the entire column R when the ECU 6 performs the front lighting cooperation processing as the lighting cooperation processing. Thus, the vehicle control system 1 and the column traveling system 100 can cause the headlight 51a of the head vehicle in the column R to output the front illumination light, and cause the headlight 51a of the succeeding vehicle to be in a lighting-OFF state in a situation in which the front illumination light is required (for example, at nighttime, or in a tunnel), so that the group of vehicles V included in the column R are enabled to be easily recognized as a cluster of vehicles with the front illumination light from the headlight 51a. As a result, the vehicle control system 1 and the column traveling system 100 can prevent a vehicle not included in the column R from cutting into the column R, for example. With the vehicle control system 1 and the column traveling system 100, in a case in which the ECU 6 performs the front lighting cooperation processing, the headlight 51a of the succeeding vehicle following the head vehicle in the column R is caused to be in a lighting-OFF state, so that waste of energy can be prevented and energy can be saved.

The vehicle control system 1 and the column traveling system 100 described above can cause pieces of the rear illumination light to cooperate with each other in the entire column R when the ECU 6 performs the rear lighting cooperation processing as the lighting cooperation processing. Thus, the vehicle control system 1 and the column traveling system 100 can cause the tail lamp 51b of the rearmost vehicle in the column R to output the rear illumination light, and cause the tail lamp 51b of the preceding vehicle to be in a lighting-OFF state, so that the group of vehicles V included in the column R are enabled to be easily recognized as a cluster of vehicles with the rear illumination light from the tail lamp 51b. As a result, the vehicle control system 1 and the column traveling system 100 can prevent a vehicle not included in the column R from cutting into the column R, for example. With the vehicle control system 1 and the column traveling system 100, in a case in which the ECU 6 performs the rear lighting cooperation processing, the tail lamp 51b of the preceding vehicle preceding the rearmost vehicle in the column R is caused to be in a lighting-OFF state, so that waste of energy can be prevented and energy can be saved.

The vehicle control system 1 and the column traveling system 100 described above can cause pieces of the direction indicating information to cooperate with each other in the entire column R when the ECU 6 performs the direction indicating information synchronization processing as the output information cooperation processing. Thus, the vehicle control system 1 and the column traveling system 100 can synchronize the output timings of the direction indicating information output from the direction indicators 52a of the respective vehicles V included in the column R, and can cause moving directions indicated by the direction indicating information to be the same, so that the group of vehicles V included in the column R are enabled to be easily recognized as a cluster of vehicles with the direction indicating information from the direction indicator 52a. As a result, the vehicle control system 1 and the column traveling system 100 can enable the fact that the group of vehicles V included in the column R move all together as a cluster of vehicles to be easily recognized, and can prevent a vehicle not included in the column R from cutting into the column R, for example.

The vehicle control system 1 and the column traveling system 100 described above can cause pieces of the visual information output from the side display device 52b to cooperate with each other in the column R when the ECU 6 performs the side visual information cooperation processing as the output information cooperation processing. Thus, the vehicle control system 1 and the column traveling system 100 can display the column identification information as a mark for specifying the column R using the visual information output from the side display device 52b of each vehicle V included in the column R, so that the group of vehicles V included in the column R are enabled to be easily recognized as a cluster of vehicles with the visual information from the side display device 52b. As a result, the vehicle control system 1 and the column traveling system 100 can cause, for example, a vehicle not included in the column R that approaches the column R from a side of the column R to easily recognize the group of vehicles V included in the column R as a cluster of vehicles with the visual information indicating the column identification information output from the side display device 52b, and can prevent the vehicle not included in the column R from cutting into the column R, for example. Specifically, for example, the vehicle control system 1 and the column traveling system 100 can obviously prevent a vehicle not included in the column R from cutting into the column R at a junction of an expressway, in a service area, and the like.

The vehicle control system 1 and the column traveling system 100 described above can cause pieces of the visual information output from the rear display device 52c to cooperate with each other in the entire column R when the ECU 6 performs the first rear visual information cooperation processing as the output information cooperation processing. Thus, the vehicle control system 1 and the column traveling system 100 can display the information of traffic lights and a sign imaged by the head vehicle included in the column R using the visual information output from the rear display device 52c of the rearmost vehicle included in the column R, so that it is possible to notify the succeeding vehicle following the column R of a state of traffic lights or a sign in front of the column R. As a result, the vehicle control system 1 and the column traveling system 100 can previously notify the succeeding vehicle following the column R of the state of the front side of the column R, for example, in a case in which the column R stops in accordance with traffic lights or a sign, so that safety can be improved.

The vehicle control system 1 and the column traveling system 100 described above can also cause pieces of the visual information output from the rear display device 52c to cooperate with each other in the entire column R when the ECU 6 performs the second rear visual information cooperation processing as the output information cooperation processing. Thus, the vehicle control system 1 and the column traveling system 100 can display the column configuration information related to the column R using the visual information output from the rear display device 52c of the rearmost vehicle included in the column R, so that it is possible to notify the succeeding vehicle following the column R of the number of vehicles included in the column R, the length of the column R, and the like. As a result, the vehicle control system 1 and the column traveling system 100 can prevent the succeeding vehicle following the column R from passing the column R by force, or cutting into the column R, for example.

By performing the lane change processing, the vehicle control system 1 and the column traveling system 100 described above can cause the rearmost vehicle in the column R to perform lane change in the first place at the time when the entire column R performs lane change, and can cause the vehicles to successively perform lane change from the preceding vehicle on the rearmost vehicle side. Thus, with the vehicle control system 1 and the column traveling system 100, a space can be secured for performing lane change by the preceding vehicle in the column R when the rearmost vehicle in the column R performs lane change in the first place at the time when the entire column R performs lane change, so that the entire column R can perform appropriate lane change, and it is possible to prevent a vehicle not included in the column R from cutting into the column R, for example. In this case, by performing the lane change processing in parallel with the intra-column cooperation processing, the vehicle control system 1 and the column traveling system 100 can cause the entire column R to perform appropriate lane change while causing the group of vehicles V included in the column R to be recognized as a cluster of vehicles.

The vehicle control system and the column traveling system according to the embodiment of the present invention described above are not limited to the embodiment described above, and various modifications can be made within a scope of CLAIMS.

In the above description, the output device 5 includes the lighting output device 51 serving as a lighting output unit and the information output device 52 serving as an information output unit, but the embodiment is not limited thereto. The output device 5 may include any one of the components, or may include another device.

In the above description, the information processing unit 62, the traveling system controller 63, the column traveling detection unit 64, and the output system controller 65 are configured by the common ECU 6, but the embodiment is not limited thereto. The information processing unit 62, the traveling system controller 63, the column traveling detection unit 64, and the output system controller 65 may be configured as individual ECUs, and may exchange various electric signals with each other.

In the above description, as the intra-column cooperation processing, exemplified are the front lighting cooperation processing, the rear lighting cooperation processing, the direction indicating information synchronization processing, the side visual information cooperation processing, the first rear visual information cooperation processing, and the second rear visual information cooperation processing, but the intra-column cooperation processing may include any other processing.

In the vehicle control system and the column traveling system according to the present embodiment, a controller controls an output unit based on communication information that is transmitted/received to/from another vehicle via a communication unit to perform intra-column cooperation processing to cause visual system outputs output by the output unit to cooperate with each other in the entire column, so that appropriate column traveling can be enabled to be performed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle control system comprising:
a communication unit that is disposed in a host vehicle, and configured to be able to transmit/receive a communication information to/from another vehicle in a column that travels while being included in the column as a group together with the host vehicle;
an output unit that is disposed in the host vehicle, and configured to be able to output a visual system output related to the sense of sight to the outside of the host vehicle; and
a controller configured to be able to perform an intra-column cooperation processing of controlling the output unit to cause a plurality of the visual system outputs to cooperate with each other in the entire column based on the communication information, wherein
the output unit includes a direction indicator configured to cause a signal lamp to be blinking-displayed to output a direction indicating information related to a moving direction of the host vehicle as the visual system output, and
the controller is configured to be able to perform, as the intra-column cooperation processing, a direction indicating information synchronization processing of controlling the direction indicator to synchronize an output timing of the direction indicating information with an output timing of other vehicle direction indicating information output from the other vehicle in the column, and to output the direction indicating information indicating the same direction as a moving direction of the other vehicle indicated by the other vehicle direction indicating information.

2. A vehicle control system comprising:
a communication unit that is disposed in a host vehicle, and configured to be able to transmit/receive a communication information to/from another vehicle in a column that travels while being included in the column as a group together with the host vehicle;
an output unit that is disposed in the host vehicle, and configured to be able to output a visual system output related to the sense of sight to the outside of the host vehicle; and
a controller configured to be able to perform an intra-column cooperation processing of controlling the output unit to cause a plurality of the visual system outputs to cooperate with each other in the entire column based on the communication information, wherein
the output unit includes a rear output unit that is disposed in the rear in the vehicle longitudinal direction of the host vehicle, and configured to output a visual information as the visual system output, and
the controller is configured to be able to perform, as the intra-column cooperation processing, a first rear visual information cooperation processing of controlling the rear output unit to output the visual information indicating information of traffic lights and a sign on a front side in the vehicle longitudinal direction imaged by the head vehicle in the vehicle longitudinal direction in the column, or configured to be able to perform a second rear visual information cooperation processing of controlling the rear output unit to output the visual information indicating a column configuration information related to the column including the host vehicle in a case in which the host vehicle is the rearmost vehicle in the vehicle longitudinal direction in the column.

3. The vehicle control system according to claim 1, wherein
the output unit includes a lighting output unit configured to output illumination light as the visual system output, and
the controller is able to perform, as the intra-column cooperation processing, a lighting cooperation processing of controlling the lighting output unit to cause pieces of the illumination light to cooperate with each other in the entire column.

4. The vehicle control system according to claim 2, wherein
the output unit includes a lighting output unit configured to output illumination light as the visual system output, and
the controller is able to perform, as the intra-column cooperation processing, a lighting cooperation processing of controlling the lighting output unit to cause pieces of the illumination light to cooperate with each other in the entire column.

5. The vehicle control system according to claim 1, wherein
the output unit includes an information output unit configured to an output visual information as the visual system output, and
the controller is configured to be able to perform, as the intra-column cooperation processing, output an information cooperation processing of controlling the information output unit to cause pieces of the visual information to cooperate with each other in the entire column.

6. The vehicle control system according to claim 2, wherein
the output unit includes an information output unit configured to an output visual information as the visual system output, and
the controller is configured to be able to perform, as the intra-column cooperation processing, output an information cooperation processing of controlling the information output unit to cause pieces of the visual information to cooperate with each other in the entire column.

7. The vehicle control system according to claim 1, wherein
the output unit includes a headlight configured to output, as the visual system output, front illumination light for lighting up the front in a vehicle longitudinal direction of the host vehicle, and
the controller is configured to be able to perform, as the intra-column cooperation processing, a front lighting cooperation processing of controlling the headlight to output the front illumination light in a case in which the host vehicle is a head vehicle in the vehicle longitudinal direction in the column, and controlling the headlight to be in a lighting-OFF state in a case in which the host vehicle is a succeeding vehicle following the head vehicle.

8. The vehicle control system according to claim 2, wherein
the output unit includes a headlight configured to output, as the visual system output, front illumination light for lighting up the front in a vehicle longitudinal direction of the host vehicle, and
the controller is configured to be able to perform, as the intra-column cooperation processing, a front lighting cooperation processing of controlling the headlight to output the front illumination light in a case in which the host vehicle is a head vehicle in the vehicle longitudinal direction in the column, and controlling the headlight to be in a lighting-OFF state in a case in which the host vehicle is a succeeding vehicle following the head vehicle.

9. The vehicle control system according to claim 1, wherein
the output unit includes a tail lamp configured to output, as the visual system output, rear illumination light for lighting up the rear in the vehicle longitudinal direction of the host vehicle, and
the controller is configured to be able to perform, as the intra-column cooperation processing, a rear lighting cooperation processing of controlling the tail lamp to output the rear illumination light in a case in which the host vehicle is a rearmost vehicle in the vehicle longitudinal direction in the column, and controlling the tail lamp to be in a lighting-OFF state in a case in which the host vehicle is a preceding vehicle preceding the rearmost vehicle.

10. The vehicle control system according to claim 2, wherein
the output unit includes a tail lamp configured to output, as the visual system output, rear illumination light for lighting up the rear in the vehicle longitudinal direction of the host vehicle, and
the controller is configured to be able to perform, as the intra-column cooperation processing, a rear lighting cooperation processing of controlling the tail lamp to output the rear illumination light in a case in which the host vehicle is a rearmost vehicle in the vehicle longitudinal direction in the column, and controlling the tail lamp to be in a lighting-OFF state in a case in which the host vehicle is a preceding vehicle preceding the rearmost vehicle.

11. The vehicle control system according to claim 1, wherein
the output unit includes a side output unit that is disposed on at least one side in a vehicle width direction of the host vehicle, and configured to output a visual information as the visual system output, and
the controller is configured to be able to perform, as the intra-column cooperation processing, a side visual information cooperation processing of controlling the side output unit to output the visual information indicating a column identification information as a mark for specifying the column including the host vehicle.

12. The vehicle control system according to claim 2, wherein
the output unit includes a side output unit that is disposed on at least one side in a vehicle width direction of the host vehicle, and configured to output a visual information as the visual system output, and
the controller is configured to be able to perform, as the intra-column cooperation processing, a side visual information cooperation processing of controlling the side output unit to output the visual information indicating a column identification information as a mark for specifying the column including the host vehicle.

13. The vehicle control system according to claim 1, wherein
the controller is configured to be able to perform a lane change processing in which, at the time when the entire column including the host vehicle performs lane change, the host vehicle starts lane change in the first place in the column in a case in which the host vehicle is the rearmost vehicle in the vehicle longitudinal direction in the column, and the host vehicle starts lane change after lane change of a succeeding vehicle following the host vehicle in a case in which the host vehicle is a preceding vehicle preceding the rearmost vehicle, in parallel with the intra-column cooperation processing.

14. The vehicle control system according to claim 2, wherein the controller is configured to be able to perform a lane change processing in which, at the time when the entire column including the host vehicle performs lane change, the host vehicle starts lane change in the first place in the column in a case in which the host vehicle is the rearmost vehicle in the vehicle longitudinal direction in the column, and the host vehicle starts lane change after lane change of a succeeding vehicle following the host vehicle in a case in which the host vehicle is a preceding vehicle preceding the rearmost vehicle, in parallel with the intra-column cooperation processing.

15. A column traveling system comprising:

the vehicle control system according to claim 1, and a plurality of the vehicle control systems that are respectively mounted on at least a plurality of vehicles in a column including the vehicles traveling as a group.

16. A column traveling system comprising:

the vehicle control system according to claim 2, and a plurality of the vehicle control systems that are respectively mounted on at least a plurality of vehicles in a column including the vehicles traveling as a group.

* * * * *